United States Patent
Soeffker et al.

(10) Patent No.: US 11,128,138 B2
(45) Date of Patent: Sep. 21, 2021

(54) DC TRACTION SUB-STATION FOR SUPPLYING AT LEAST ONE VEHICLE

(71) Applicant: ALSTOM Transport Technologies, Saint-Ouen-sur-Seine (FR)

(72) Inventors: Carsten Soeffker, Denkte (DE); Raphael Hofstaedter, Salzgitter (DE)

(73) Assignee: ALSTOM TRANSPORT TECHNOLOGIES, Saint-Ouen sur Seine (FR)

( * ) Notice: Subject to any disclaimer, the term of this patent is extended or adjusted under 35 U.S.C. 154(b) by 0 days.

(21) Appl. No.: 16/746,827

(22) Filed: Jan. 18, 2020

(65) Prior Publication Data
US 2020/0235579 A1     Jul. 23, 2020

(30) Foreign Application Priority Data
Jan. 23, 2019 (EP) ..................... 19305088

(51) Int. Cl.
*H02J 3/32* (2006.01)
*B60L 7/10* (2006.01)
(Continued)

(52) U.S. Cl.
CPC ........ *H02J 3/32* (2013.01); *B60L 7/10* (2013.01); *B60L 9/04* (2013.01); *B60M 3/06* (2013.01);
(Continued)

(58) Field of Classification Search
None
See application file for complete search history.

(56) References Cited

U.S. PATENT DOCUMENTS

2005/0039630 A1* 2/2005 Kumar ............... B60L 50/15
105/35
2010/0063646 A1 3/2010 Ibaiondo Madariaga et al.
(Continued)

FOREIGN PATENT DOCUMENTS

EP      3032728 A1    6/2016
JP    2008168795 A    7/2008
(Continued)

OTHER PUBLICATIONS

Zeh, Alexander et. al., "Fundamentals of Using Battery Energy Storage Systems to Provide Primary Control Reserves in Germany," Batteries, vol. 2(29), Sep. 13, 2016, MDPI, pp. 1-21.
(Continued)

*Primary Examiner* — Jared Fureman
*Assistant Examiner* — Aqeel H Bukhari
(74) *Attorney, Agent, or Firm* — Soquel Group LLC

(57) ABSTRACT

A DC traction sub-station for supplying at least one vehicle, preferentially a railway vehicle, with a direct current, including a first terminal connecting the DC traction sub-station to an alternating current electrical power grid, a second terminal connecting the DC traction sub-station to a power supply conductor in order to provide driving current to the at least one vehicle or to receive regenerative braking current from the at least one vehicle, a third terminal connected to an energy storage device, one or more first current supply chains electrically connecting the first terminal to the second terminal, wherein the first current supply chain includes a first AC/DC converter, and one or more second current supply chains electrically connecting the first terminal to the third terminal, wherein the second current supply chain includes a second AC/DC converter, and wherein a DC/DC converter electrically connects the second terminal to the third terminal.

11 Claims, 1 Drawing Sheet

(51) Int. Cl.
    *B60M 3/06*     (2006.01)
    *H02J 7/04*     (2006.01)
    *B60L 9/04*     (2006.01)
    *H02M 7/06*     (2006.01)
(52) U.S. Cl.
    CPC ............... *H02J 7/04* (2013.01); *H02M 7/06* (2013.01); *B60L 2200/26* (2013.01); *B60L 2210/10* (2013.01); *B60L 2210/30* (2013.01); *B60Y 2200/30* (2013.01)

(56) References Cited

U.S. PATENT DOCUMENTS

2013/0147441 A1   6/2013  Lee et al.
2016/0159250 A1*  6/2016  Meng .................... B60M 1/307
                                                      191/2

FOREIGN PATENT DOCUMENTS

KR      101437349 B1    9/2014
WO      2017060444 A1   4/2010

OTHER PUBLICATIONS

Khodaparastan, M. et al, "Recuperation of Regenerative Braking Energy in Electric Rail Transit Systems," Arxiv.org, Cornell University Library, Aug. 17, 2018, pp. 1-6.
European Search Report for Application No. EP 19 30 5088, dated Jul. 5, 2019, 6 pp.

* cited by examiner

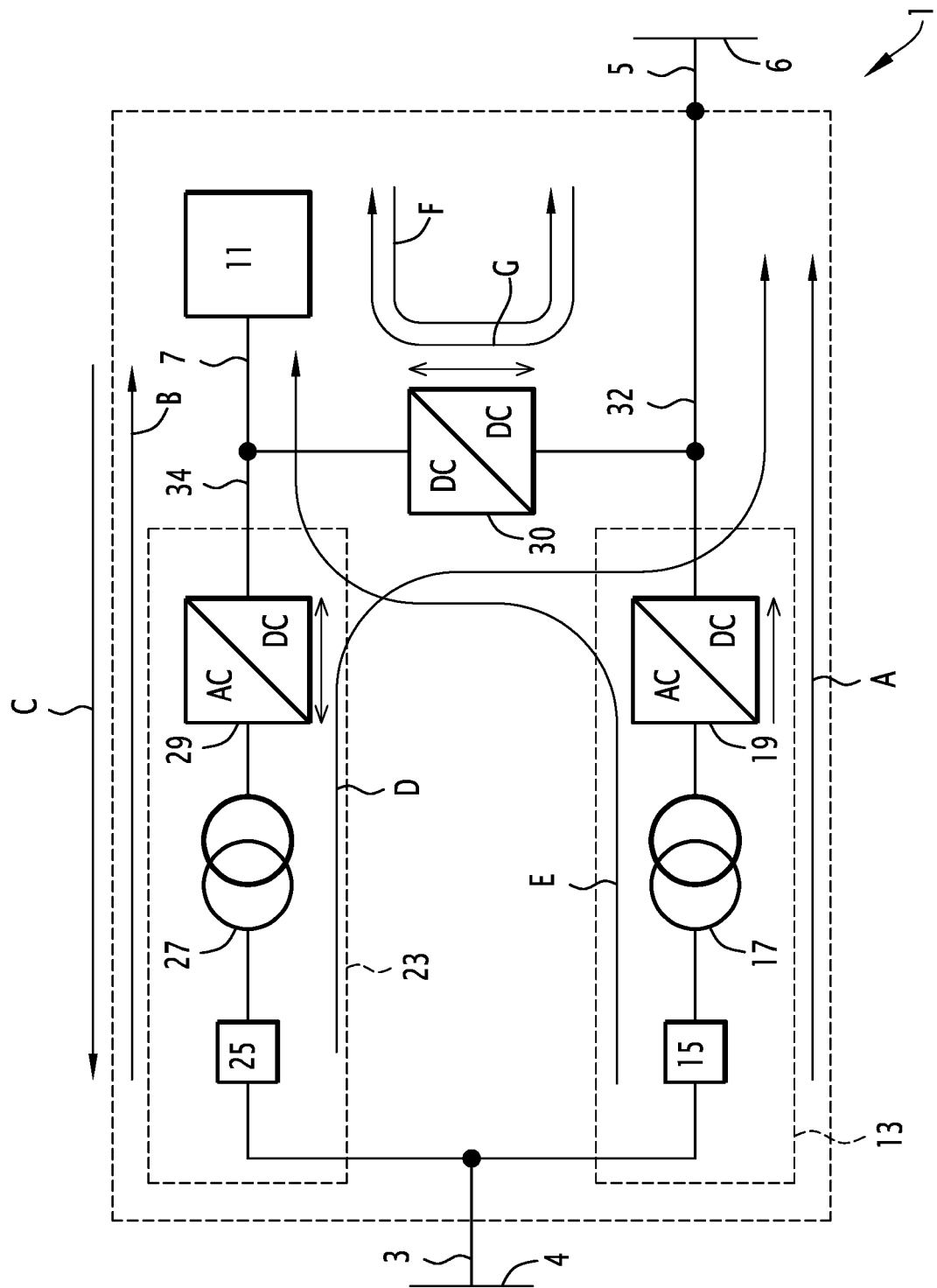

DC TRACTION SUB-STATION FOR SUPPLYING AT LEAST ONE VEHICLE

CROSS-REFERENCE TO RELATED APPLICATIONS

This application claims priority of European Patent Application No. 19 305 088.7, filed on Jan. 23, 2019.

FIELD OF THE INVENTION

The present invention generally relates to a DC traction sub-station for supplying at least one vehicle, preferentially a railway vehicle, with a direct current, DC, including a first terminal adapted to connect the power supply and storage system to an electric power grid, and a second terminal adapted to connect the power supply and storage system to a power supply conductor in order to provide driving current to the at least one railway vehicle or to receive regenerative braking current from the at least one railway vehicle.

BACKGROUND OF THE INVENTION

In classical systems the total DC power request from all rail vehicles in vicinity of the DC substation needs to be satisfied instantaneously by the AC grid through a transformer and a rectifier. Thus, the function of power versus time is varying frequently. Should the braking energy of these trains exceed the total traction needs, dissipation by means of brake resistors is necessary.

WO 2017/060444 A1 discloses an arrangement for supplying traction power to a railway device comprising an energy storage system.

US 2013/0147441 A1 relates to an automatic tuning method for energy storage system of a railway vehicle.

Several architectures have been proposed to provide a power supply and storage system for a railway network. For example, the SEPTA (Southeastern Pennsylvania Transportation Authority) has proposed an architecture for a power supply and storage system, where a rechargeable battery was electrically coupled via a DC/DC converter to the power supply conductor. Further, the power supply conductor is connected via a unidirectional AC/DC converter to the electrical power grid. The rechargeable battery was charged, for example, via the DC/DC converter, by regenerative braking of trains.

With such architecture, the current cannot be fed back into the electrical power grid, neither from the rechargeable battery nor from the trains using regenerative braking. In particular, when using architecture with classical rectifiers only, frequency regulation is only possible around an average traction load, i.e., not 24 hours a day. However, it is a mandatory requirement for primary control reserve in many countries that a frequency regulation is available 24 hours a day. Primary control reserve is the most economical market platform for energy storage systems with short reaction times but low energy content, like for examples batteries coupled to the AC grid via electrical power converters.

SUMMARY OF THE DESCRIPTION

An object of the present disclosure is to provide a power supply and storage system for a railway network, which can be easily implemented in current existing power supply systems, i.e., where the presently used devices can be continued to be used and enable to feed back energy from the trains and the energy storage device in the electrical power grid. Further, the architecture should easily comply with regulatory provisions and have a high flexibility.

According to one aspect, a DC traction sub-station for supplying at least one vehicle, preferentially a railway vehicle, with a direct current, DC, comprising:
a first terminal adapted to connect DC traction sub-station to an alternating current, AC, electrical power grid;
a second terminal adapted to connect DC traction sub-station to a power supply conductor in order to provide driving current to the at least one vehicle or to receive regenerative braking current from the at least one vehicle;
a third terminal adapted to be connected to an energy storage device for storing electrical energy;
one or more first current supply chains electrically connecting the first terminal to the second terminal, wherein the first current supply chain comprising a first AC/DC converter;
one or more second current supply chains electrically connecting the first terminal to the third terminal, wherein the second current supply chain comprising a second AC/DC converter, and wherein a DC/DC converter electrically connects, within the DC traction sub-station, the second terminal to the third terminal.

Further embodiments may relate to one or more of the following features, which may be combined in any technical feasible combination:
- the power supply conductor is at least one selected of a catenary, a ground rail and an overhead rail;
- the energy storage device is a rechargeable battery, a pumped hydroelectric energy storage, a fly-wheel electrical storage, compressed air energy storage, at least one capacitor, or the like;
- the first AC/DC converter is a unidirectional AC/DC converter converting from an alternating current to a direct current;
- the first AC/DC converter is a bidirectional AC/DC converter converting from an alternating current to a direct current and vice versa;
- DC traction sub-station according to one of the preceding claims, wherein the second AC/DC converter is a bidirectional AC/DC converter converting from an alternating current to a direct current and vice versa;
- the DC/DC converter is a bidirectional DC/DC converter;
- in the first current supply chain, a first electricity meter for measuring electrical energy is electrically connected between the first terminal and the first AC/DC converter;
- in the second current supply chain, a second electricity meter for measuring electrical energy is electrically connected between the first terminal and the second AC/DC converter;
- in the first current supply chain, a transformer is electrically connected between the first terminal and the first AC/DC converter, preferably between a first electricity meter and the first AC/DC converter; and/or
- in the second current supply chain, a transformer is electrically connected between the first terminal and the second AC/DC converter, preferably between a second electricity meter and the second AC/DC converter.

BRIEF DESCRIPTION OF THE DRAWINGS

So that the manner in which the above recited features of the present invention can be understood in detail, a more particular description of the invention, briefly summarized above, may be read by reference to embodiments. The accompanying drawing relates to embodiments of the invention and is described in the following:

FIG. 1 shows schematically the electric circuit of a traction sub-station for a railway, in particular a DC (direct current) traction substation.

DETAILED DESCRIPTION

A DC traction sub-station 1 is provided in order to supply at least one railway vehicle with a direct current, DC, for traction. DC traction sub-station 1 includes a first terminal 3 adapted to connect DC traction sub-station 1 to an electrical power grid 4. Electrical power grid 4 is, for example, an AC (alternating current) power grid and connected to electrical energy producing plants. Further, DC traction sub-station 1 includes a second terminal 5 adapted to connect DC traction sub-station 1 to a power supply conductor 6 in order to provide current to the at least one railway vehicle, or to receive regenerative braking current from the at least one railway vehicle. According to embodiments of the present invention, the power supply conductor 6 is at least one selected of a catenary, a third rail, i.e., a ground rail, and an overhead rail. The nominal voltage for driving or traction current of railway vehicles is for example 600V, 750V, 1200V, 1500V or 3 kV. Power supply conductor 6 extends in parallel to a railway track in order to enable the railway vehicles to continuously contact power supply conductor 6 when travelling along the railway track, for example using a pantograph or a current collector shoe.

Further, DC traction sub-station 1 includes a third terminal 7 adapted to be connected to an energy storage device 11 for storing electrical energy. The energy storage may be a rechargeable battery, a pumped hydroelectric energy storage, a fly-wheel electrical storage, compressed air energy storage, at least one capacitor, super-cap, or the like, or a combination thereof.

Each terminal 3, 5, 7 may include one or more electrical connecting wires. For example, electrical power grid 4 may provide a three-phase current to DC traction sub-station 1.

According to embodiments, DC traction sub-station 1 includes a first current supply chain 13 electrically connecting first terminal 3 to second terminal 5. According to an embodiment, first current supply chain 13 includes a first electricity meter 15, a first transformer 17, and a first AC/DC converter 19, in this order.

First electricity meter 15 is provided for measuring electrical energy provided to first current supply chain 13 and is, for example, electrically connected between first terminal 3 and first transformer 17.

First transformer 17 transforms a first AC current, for example, a three-phase current, having a first voltage into a second AC current having a second voltage. According to some embodiments, the second voltage is lower than the first voltage. The first voltage side of first transformer 17 is directed towards the electrical power grid. The first voltage may be between 5 kV and 50 kV, in particular between 10 kV and 20 kV, for example, 10 kV, 11 kV or 20 kV. The second voltage is, for example, 20 to 40% lower than the nominal DC voltage for driving or traction current of railway vehicles as discussed above.

Finally, first AC/DC converter 19 is electrically connected between first transformer 17 and second terminal 5. First AC/DC converter 19 is a unidirectional AC/DC converter converting from the alternating current, for example, from first transformer 17 and/or from electrical power grid 4 connected to first terminal 3 to a direct current intended to provide driving current to the at least one railway vehicle and/or to provide charging current to energy storage device 11 for storing electrical energy. For example, first AC/DC converter 19 may be a rectifier.

Alternatively, first AC/DC converter 19 is a bidirectional AC/DC converter.

In some embodiments, first transformer 17 may be omitted in first current supply chain 13. Then, first electricity meter 15 is directly connected to AC/DC converter 19. In other embodiments, first electricity meter 15 may be placed between first transformer 17 and first AC/DC converter 19.

According to embodiments of the present invention, DC traction sub-station 1 includes a second current supply chain 23 electrically connecting first terminal 3 to third terminal 7. According to an embodiment of the present invention, second current supply chain 23 includes a second electricity meter 25, a second transformer 27, and a second AC/DC converter 29, in this order.

Second electricity meter 25, being provided for measuring electrical energy, is electrically connected between first terminal 3 and second transformer 27. Second electricity meter 25 is adapted to measure electrical energy flowing in both directions, towards electrical power grid 4 and from electrical power grid 4.

Second transformer 27 transforms a first AC current, for example a three-phase current, having a first voltage into a second AC current having a second voltage, and vice versa. According to some embodiments, the second voltage is lower than the first voltage. The first voltage side of second transformer 27 is directed towards electrical power grid 4. The first voltage may be between 5 kV and 50 kV, in particular between 10 kV and 20 kV, for example, 10 kV, 11 kV or 20 kV. The second voltage is for example between 100V and 10 kV, and/or depends on energy storage device 11 connected at third terminal 7.

Second AC/DC converter 29 is electrically connected between second transformer 27 and third terminal 7. Second AC/DC converter 29 is a bidirectional AC/DC converter converting from the alternating current, for example, from second transformer 27 and/or from electrical power grid 4 connected to first terminal 3 to a direct current intended to provide driving current to the at least one railway vehicle, and/or to energy storage device 11 for storing electrical energy, and vice versa. In some embodiments, second transformer 27 may be omitted in second current supply chain 23. In other embodiments, second electricity meter 25 may be placed between second transformer 27 and second AC/DC converter 29.

According to an embodiment, DC traction sub-station 1 includes a DC/DC converter 30, electrically connecting second terminal 5 with third terminal 7. In other words, the connection of second terminal 5 to third terminal 7 is provided within the DC traction sub-station. For that purpose, DC/DC converter 30 is connected to a first electrical connection 32 between first current supply chain 13 and second terminal 5 on one side, and to a second electrical connection 34 between second current supply chain 23 and third terminal 7 at the other side. First electrical connection 32 and second electrical connection 34 are provided within DC traction sub-station 1.

DC/DC converter 30 is a bidirectional converter converting a DC current having a first voltage for charging or discharging energy storage system 11 to a DC current having a second voltage to be used as traction current for railway vehicles.

In other words, DC/DC converter 30 defines another supply chain in order to electrically connect first terminal 3 via first current supply chain 13 to energy storage device 11, to electrically connect first terminal 3 via second current supply chain 23 to second terminal 5, or to electrically connect energy storage device 11 to second terminal 5.

In a first function, DC traction sub-station 1 provides a DC power supply for railway vehicles along the route shown with the arrow A, via optional first transformer 17, first AC/DC converter or rectifier 19, and second terminal 5 to power supply conductor 6 in order to provide driving current to the at least one railway vehicle.

In some embodiments, other loads like electric road vehicles, for example electric busses, electric trucks, electric cars, electric vans or even electric bikes could be supplied with DC current from second terminal 5.

In a second function, DC traction sub-station 1 is adapted to provide electrical energy from electrical power grid 4 to energy storage system 11, for example, for charging a battery, along the route shown in FIG. 1 with the arrow B, via second transformer 27, second AC/DC converter 29 and third terminal 7.

In a third function, DC traction sub-station 1 is adapted to provide electrical energy from energy storage system 11 to electrical power grid 4 along the route shown in FIG. 1 with the arrow C.

In other words, DC traction sub-station 1, in particular energy storage system 11, may be dimensioned to qualify as a primary control reserve. For that purpose, energy storage system 11 has a capacity of at least 350 kWh.

In other words, DC traction sub-station 1 may be used in a primary control reserve to balance the electrical energy consumption in electrical power grid 4 with the electrical energy production. For that purpose, DC traction sub-station 1 is controlled by measuring the frequency of electrical power grid 4 in order to act as a primary control reserve. The objective of the activation of the control reserve is to maintain the frequency of electrical power grid 4 on the target frequency of, for example, 50 or 60 Hz and/or to eliminate regional deviations in the balance from their reference values. For example, as a primary control reserve the charging and discharging of energy storage system 11 may be activated within 30 seconds and the period per incident to be covered is between 0 and 30 minutes. The request to act as primary control request is automatically generated, in particular of a controller of DC traction sub-station 1, as a function of a frequency deviation from the nominal value, for example, 50 Hz as indicated above, in electrical power grid 4. The requested power needs to be provided for a certain time.

In another function, second current supply chain 23 and DC/DC converter 30 may be used to provide the DC driving or traction current for a railway vehicle at second terminal 5, see arrow D, via optional second transformer 27, second AC/DC converter 29 and DC/DC converter 30. Or vice versa, for example, if more railway vehicles are using regenerative braking than accelerating and energy storage system 11 shall not receive the energy.

In a further function, first current supply chain 13 and DC/DC converter 30 may be used to provide energy to energy storage system 11, see arrow E, via optional first transformer 17, first AC/DC converter 19 or rectifier, and DC/DC converter 30. Thus, energy storage system 11 may be charged using first current supply chain 13.

In another function, energy storage system 11 and DC/DC converter 30 are used to provide traction current to power supply conductor 6 for a railway vehicle, see arrow F.

FIG. 1 shows a further function, namely, energy storage system 11 and DC/DC converter 30 are used to store energy provided from power supply conductor 6 via second terminal 5, for example, if more railway vehicles are using regenerative braking than accelerating, see arrow G.

Thus, in order to have a smoother function of power versus time on the energy supply grid (peak shaving), energy storage system 11 can be used to buffer energy from electrical power grid 4 received via first terminal 3 before supplying it to the railway vehicles via DC/DC converter 30 (arrows B and F). Moreover, excess energy from the DC rail power system can also be buffered for later use (arrow G). Thus, the number of brake resistors in order to transform superfluous energy in heat may be reduced or even omitted.

In some embodiments, if electrical power grid 4 fails, the energy storage system may provide electrical energy (arrow F) to the railway vehicles in order to allow them to move the trains to safe positions, for example for evacuation of the passengers.

According to embodiments, DC traction sub-station 1 is adapted to switch between the different functions, or may use even several functions even in parallel, for example, energy storage system 11 may be charged or discharged using second current supply chain 23 (arrows B and C) in parallel to the provision of electrical energy to second terminal 5 via first current supply chain 13 (arrow A).

According to the invention, the coupling of frequency regulation for an AC power grid with energy efficient rail power supply is provided, in order to reduce the investment.

Further, the primary control reserve is measured, according to an embodiment, with second electricity meter 25 while the rail power supply is measured separately with first electricity meter 15.

Further, already used equipment in first current supply chain 13 may stay in place when upgrading to the DC traction substation with second current supply chain 23 and DC/DC converter 30.

Finally, the energy consumption from electrical power grid 4 is reduced.

The invention claimed is:

1. A DC traction sub-station for supplying at least one vehicle with a direct current, DC, comprising:
   a first terminal adapted to connect a DC traction sub-station to an alternating current, AC, electrical power grid;
   a second terminal adapted to connect the DC traction sub-station to a power supply conductor in order to provide driving current to the at least one vehicle, or to receive regenerative braking current from the at least one vehicle;
   a third terminal adapted to be connected to an energy storage device for storing electrical energy;
   one or more first current supply chains electrically connecting said first terminal to said second terminal, each of the first current supply chains comprising a first AC/DC converter; and
   one or more second current supply chains electrically connecting said first terminal to said third terminal, each of the second current supply chains comprising a second AC/DC converter, wherein a DC/DC converter electrically connects, within the DC traction sub-station, said second terminal to said third terminal, wherein the DC/DC converter is connected to a first electrical connection between the first current supply chain and the second terminal on one side, and to a second electrical connection between the second current supply chain and the third terminal at the other side, wherein said second AC/DC converter is a bidirectional AC/DC converter converting from an alternating current to a direct current and vice versa, and wherein the DC/DC converter is a bidirectional DC/DC converter.

2. The DC traction sub-station according to claim 1, wherein the power supply conductor is at least one selected of a catenary, a ground rail and an overhead rail.

3. The DC traction sub-station according to claim 1, wherein the energy storage device is a rechargeable battery, a pumped hydroelectric energy storage, a fly-wheel electrical storage, compressed air energy storage, or at least one capacitor.

4. The DC traction sub-station according to claim 1, wherein said first AC/DC converter is a unidirectional AC/DC converter converting from an alternating current to a direct current.

5. The DC traction sub-station according to claim 1, wherein said first AC/DC converter is a bidirectional AC/DC converter converting from an alternating current to a direct current and vice versa.

6. The DC traction sub-station according to claim 1, wherein, in each of said first current supply chains, a first electricity meter for measuring electrical energy is electrically connected between said first terminal and said first AC/DC converter.

7. The DC traction sub-station according to claim 1, wherein, in each of said second current supply chains, a second electricity meter for measuring electrical energy is electrically connected between said first terminal and said second AC/DC converter.

8. The DC traction sub-station according to claim 1, wherein, in each of said first current supply chains, a transformer is electrically connected between said first terminal and said first AC/DC converter.

9. The DC traction sub-station according to claim 8, wherein the transformer is electrically connected between a first electricity meter and said first AC/DC converter.

10. The DC traction sub-station according to claim 1, wherein, in each of said second current supply chains, a transformer is electrically connected between said first terminal and said second AC/DC converter.

11. The DC traction sub-station according to claim 10, wherein the transformer is electrically connected between a second electricity meter and said second AC/DC converter.

* * * * *